United States Patent
Tateiwa

(10) Patent No.: US 7,016,574 B2
(45) Date of Patent: Mar. 21, 2006

(54) OPTICAL COLLIMATOR STRUCTURE

(75) Inventor: Akihiko Tateiwa, Nagano (JP)

(73) Assignee: Shinko Electric Industries Co., Ltd., Nagano (JP)

( * ) Notice: Subject to any disclaimer, the term of this patent is extended or adjusted under 35 U.S.C. 154(b) by 52 days.

(21) Appl. No.: 10/790,871

(22) Filed: Mar. 3, 2004

(65) Prior Publication Data

US 2004/0208440 A1    Oct. 21, 2004

(30) Foreign Application Priority Data

Mar. 14, 2003   (JP) ............................. 2003-069140

(51) Int. Cl.
 *G02B 6/32*   (2006.01)
(52) U.S. Cl. ............................. 385/47; 385/33; 385/42
(58) Field of Classification Search ............... 385/27, 385/31, 39, 42, 49, 50, 51, 78, 95, 124
See application file for complete search history.

(56) References Cited

U.S. PATENT DOCUMENTS 5,953,477 A  *  9/1999  Wach et al. ............... 385/115
2002/0085807 A1 * 7/2002 Xiaofan ..................... 385/33
2002/0114568 A1   8/2002 Judkins
2002/0141705 A1 * 10/2002 Duelli et al. ............... 385/49
2005/0084206 A1 * 4/2005 Gutin et al. ............... 385/24

FOREIGN PATENT DOCUMENTS

JP       9-230169     9/1997
JP    2002-267876    9/2002

* cited by examiner

*Primary Examiner*—John D. Lee
*Assistant Examiner*—James D. Stein
(74) *Attorney, Agent, or Firm*—Staas & Halsey LLP

(57) ABSTRACT

An optical collimator structure comprising an optical fiber assembly of a plurality of unitary single-mode optical fibers each having a core, and a ferrule for supporting the optical fiber assembly inserted partially therein and bonded thereto, wherein the core has a graded index optical fiber bonded to the end face thereof, the graded index optical fiber along with the end portion of the core to which the graded index optical fiber is bonded being inserted in a hole of a capillary provided at an end of the ferrule, and the end face of the graded index optical fiber for emitting or receiving a beam of light has a tilt angle relative to the optical axis of the optical collimator structure.

11 Claims, 3 Drawing Sheets

OPTICAL COLLIMATOR STRUCTURE

BACKGROUND OF THE INVENTION

1. Field of the Invention

The invention relates to an optical collimator structure and, particularly, to an optical collimator structure using an optical fiber provided with a plurality of cores.

2. Description of the Related Art

In the field of optical communication, various optical circuit modules, for operations such as combination and branching of signal lights, and for switching optical paths, are used. An optical collimator structure is provided with configuration for emitting a parallel flux of light from an optical fiber or receiving a parallel flux of light. Optical collimator structures include, in addition to those making signal light into parallel flux of light using a single core optical fiber, those having collimator structures using two core optical fibers, as shown in FIG. 5 (see, for example, Japanese Unexamined Patent Publications (Kokai) No. 9-230169 (JP 9-230169 A) and Japanese Unexamined Patent Publications (Kokai) No. 2002-267876 (JP 2002-267876 A).

In FIG. 5, a first optical fiber for an inlet port is indicated by reference numeral 10a, and a second optical fiber for an outlet port is indicated by 10b. The cores of the first and second optical fibers 10a, 10b, which are exposed by removing the respective claddings, are indicated by reference numerals 12a, 12b. A capillary 14 accurately aligns the optical axes of the cores 12a and 12b with each other and supports them. The capillary 14 is made of a ceramic, such as zirconia. The cores 12a, 12b are aligned with each other by inserting them in holes penetrating the capillary 14. The capillary 14 and the optical fibers 10a, 10b are supported by a ferrule 16. Specifically, the capillary 14 is supported by pressing it into the ferrule 16, and the optical fibers 10a, 10b are supported by adhering them, to the fixing opening in the ferrule 16, with an adhesive 18.

An optical lens 20 is positioned in front of the ferrule 16. The optical lens 20 serves as a collimator that receives an incident beam of light from the core 12a of the first optical fiber 10a and emits a parallel beam of light toward a mirror 22, and receives a parallel beam of light from the mirror 22 and emits a beam of light so as to collect it to the end face of the core 12b of the second optical fiber 10b.

Thus, in the optical collimator structure of FIG. 5, the mirror 22 is positioned, in front of the optical lens 20, to reflect the parallel beam of light emitted from the optical lens 20, and collect the reflected beam of light to the end face of the core 12b through the optical lens 20. This optical collimator structure represents an example comprising a dual-core optical fiber assembly 10, which has two optical fibers 10a, 10b each having the core 12a, 12b, and uses the first optical fiber 10a as an inlet port, and the second optical fiber 10b as an outlet port.

As shown in FIG. 5, a conventional optical collimator structure constructed using a multi-core optical fiber assembly comprising a plurality of unitary optical fibers, in which a unitary optical fiber is employed as an inlet port, and another unitary optical fiber is employed as an outlet port, combines an optical lens 20 with an optical fiber assembly 10. As the optical lens 20, a spherical lens, aspherical lens, SELFOC lens or the like is used. The optical lens 20 is accurately aligned with the optical fiber assembly 10 to provide a collimator structure. In the structure shown in FIG. 5, the optical lens 20 is fixed at the front end of a sleeve 24, and the sleeve 24 is then fixed to the outer periphery of the ferrule 16 by YAG welding while aligning the optical lens 20 with the end face of the cores 12a, 12b supported by the capillary 14 to retain a certain distance therebetween.

In this way, as the conventional optical collimator structure comprising the optical fiber assembly 10 having a plurality of cores uses the optical lens 20 for the construction of the structure, the optical lens 20 must be adjusted with high accuracy, of the order of 1 micrometer, relative to the cores 12a, 12b of the optical fiber assembly 10, which requires a high degree of assembling accuracy. Further, for the fabrication of the conventional optical collimator structure, processing, such as YAG welding of the sleeve 24 to the ferrule 16, is needed, resulting in problems, such as expensive processing and fabrication. In addition, the conventional optical structure has a large number of parts, such as the optical lens 20 and the sleeve 24, which causes a difficulty in reducing the manufacturing cost.

SUMMARY OF THE INVENTION

It is an object of the invention to provide an optical collimator structure using an optical fiber assembly having a plurality of cores, which enables the parts cost to be lowered by simplifying the construction of the structure and decreasing the number of parts, and also enables the manufacturing cost to be lowered by facilitating the fabricating work, such as alignment, to provide a product having high accuracy and reliability, to solve the above problems.

According to the invention, there is provided an optical collimator structure comprising an optical fiber assembly of a plurality of unitary single-mode optical fibers each having a core, and a ferrule for supporting the optical fiber assembly inserted partially therein and bonded thereto, wherein the core has a graded index optical fiber bonded to the end face thereof, the graded index optical fiber along with the end portion of the core to which the graded index optical fiber is bonded being inserted in a hole of a capillary provided at an end of the ferrule, and the end face of the graded index optical fiber for emitting or receiving a beam of light having a tilt angle relative to the optical axis of the optical collimator structure.

The end face of the graded index optical fiber can have a tilt angle relative to the optical axis of the optical collimator structure, which is preferably the same as that of the capillary.

The capillary can have a conically shaped end face, at which the end face of the graded index optical fiber is located.

Alternatively, the capillary can have an end with facets, at one of which facets the end face of the graded index optical fiber is located.

Preferably, the end faces of the respective graded index optical fibers are arranged symmetrically relative to the center of the capillary.

Preferably, the graded index optical fiber is bonded to the end of the core by fusion bonding.

The optical collimator structure of the invention may be used in combination with an optical component, such as a mirror, a filter, or a branching filter.

The optical collimator structure of the invention may also be used to emit a beam of light and receive a totally or partially reflected beam of light, or only to emit or receive a beam of light.

BRIEF DESCRIPTION OF THE DRAWINGS

The above and other objects and advantages of the invention will be well understood and appreciated by a person with ordinary skill in the art, from consideration of the following detailed description made by referring to the attached drawings, wherein.

DETAILED DESCRIPTION OF THE INVENTION

Figure 1:
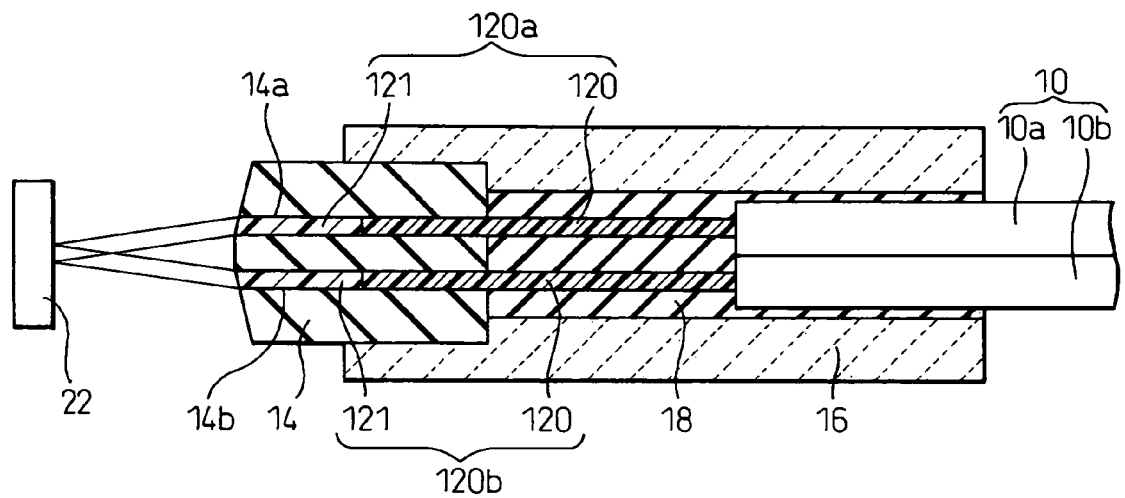
FIG. 1 is an illustration of an embodiment of the optical collimator structure of the invention.

FIG. 1 shows an optical collimator structure of an embodiment of the invention, which is constructed using an optical fiber assembly 10 comprising a first unitary optical fiber 10a and a second unitary optical fiber 10b each having a core 120. The optical collimator structure of the invention is characterized by using the optical fiber assembly 10 to construct the optical collimator structure, the optical fiber assembly 10 having a graded index optical fiber (GI optical fiber) 14a (or 14b) fusion bonded to the end of the core 120 of each of single-mode optical fibers (SMFs) 10a, 10b forming the optical fiber assembly 10, so that each of the single mode optical fibers has an optical collimator structure.

Figure 2:
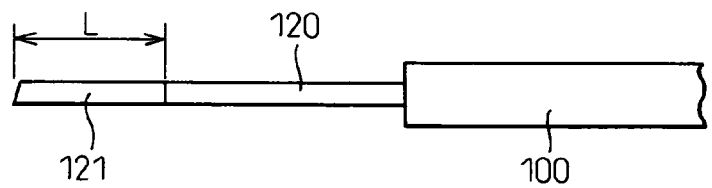
FIG. 2 is an illustration of a collimator structure of a single-core formed of a single-mode optical fiber and a graded index optical fiber (GI optical fiber)

FIG. 2 illustrates an example of the collimator structure of a single-core fiber, in which a GI optical fiber 121 is fusion bonded to the end of the core 120 of a single-mode optical fiber 100. To obtain the collimator structure by fusion bonding the GI optical fiber 121 to the end of the core 120 of the single-mode optical fiber 100, it is necessary that the GI optical fiber 121, to be fusion bonded to the end of the core 120 of the single-mode optical fiber 100, has a length L that is ¼ of the wavelength determined based on the convergence constant of the GI optical fiber 121 or odd number-times the ¼ of that wavelength. By fusion bonding the GI optical fiber having the length as defined above to the end of the core 120 of the single-mode optical fiber 100, a parallel beam of light is emitted from the end of the GI optical fiber 121.

In this way, when the collimator structure is formed by fusion bonding the GI optical fiber 121 to the end of the core 120 of the single-mode optical fiber 110, the length of the GI optical fiber fusion bonded to the end of the core 120 of the single-mode optical fiber 110 directly influences the accuracy of a product. Therefore, it is very important, to obtain a collimator structure having a desired quality, that the GI optical fiber 121 can be processed at a high accuracy so as to have a certain length. Heretofore, it has been common to use a method in which a GI optical fiber is fusion bonded to the end of the core of a single-mode optical fiber, and the free end of the GI optical fiber is ground so that the GI optical fiber eventually has a predetermined length.

As shown in FIG. 1, the optical collimator structure of this embodiment of the invention uses the optical fiber assembly 10 having two cores, in which the cores 120a, 120b of the respective optical fibers 10a, 10b have the collimator structure of a single-core fiber as described above. The optical fiber assembly 10 is supported by inserting the end portions of the cores 120a, 120b, which are provided with the GI optical fibers 121, in a capillary 14, which is pressed into the front end of a cylindrical ferrule 16 to be fixed, and bonding the remainder of portions of the cores 120, which are exposed by removing the cladding from the first and second optical fibers 10a, 10b, along with the cladding of the first and second optical fibers 10a, 10b to the inside wall of the ferrule 16 by use of an adhesive 18.

The capillary 14 has holes 14a, 14b, formed at a predetermined distance, in which the cores 120a, 120b are to be inserted. By inserting the cores 120a, 120b in the holes 14a, 14b, the two cores 120a, 120b can be supported while being aligned at a predetermined distance. The cores 120a, 120b are formed of the cores 120 exposed by partially removing the claddings of the first and second optical fibers 10a, 10b and extend from the ends of the claddings of the first and second optical fibers 10a, 10b, and the GI optical fibers 14a, 14b fusion bonded to the ends of the exposed cores 120.

In the optical collimator structure of this embodiment, the first optical fiber 10a serves as an input port, and the second optical fiber 10b serves as an outlet port. In other words, a beam of signal light inputted to the first optical fiber 10a is emitted as a parallel beam of light from the end face of the core 120a, and a parallel beam of light reaching the end face of the core 120b is outputted from the second optical fiber as a beam of signal light.

In FIG. 1, the optical collimator structure is formed in such a manner that a beam of signal light inputted to the first optical fiber 10a is emitted as a parallel beam of light from the end face of the core 120a toward a mirror 22, and a beam of light reflected by the mirror 22 reaches the end face of the core 120b to be outputted from the second optical fiber 10b. In other words, the optical collimator structure is formed to have an optical system by arranging the cores 120a, 120b (or holes 14a, 14b) symmetrically relative to the optical axis (center line) of the collimator structure, disposing the mirror 22 to have a reflecting face which is perpendicular to the optical axis of the collimator structure, and adjusting the distance between the reflecting face of the mirror 22 and the end faces of the cores 120a, 120b, so that a beam of light emitted from the end face of the core 120a is reflected at the center of the optical axis of the mirror 22 and reaches the end face of the core 120b.

To ensure that the beam of light emitted from the core 120a of the first optical fiber 10a is reflected by the mirror 22 and enters the core 120b of the second optical fiber 10b, the beam of light emitted from the core 120a may be bent relative to the optical axis of the core 120a during its emission from the core 120a so as to be directed toward the center of optical axis of the mirror 22. The angles of refraction of light at the end faces of the cores 120a, 120b can be determined from the index of refraction of the optical fiber and the like by calculation. By discretionally setting the tilt angle of the end face of the core 120a, the angle of bending of the beam of light emitted from the core 120a can be adjusted accordingly.

Figure 3:
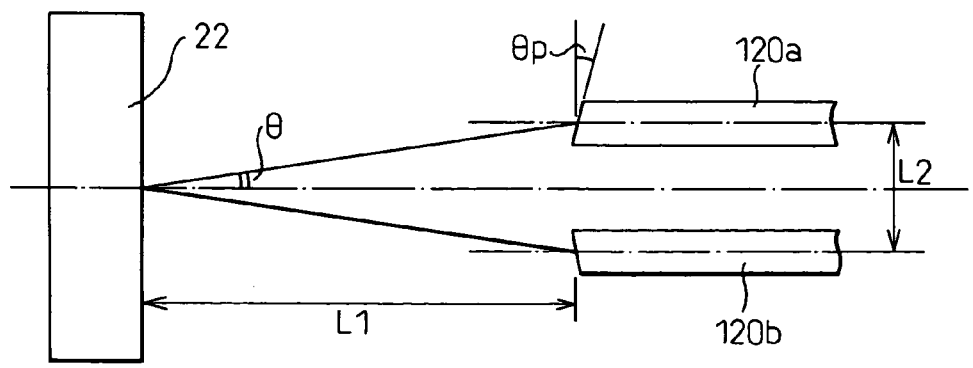
FIG. 3 illustrates the tilt angle of the end faces of cores worked to provide a collimator structure.

As shown in FIG. 3, in the case where the distance L1 between the end face of the core 120a, 120b and the mirror 22 is 2 millimeters, and the distance L2 between the cores 120a and 120b is 375 micrometers, the incident angle θ of light coming to the mirror is 5.356°, and, assuming that the refractive index n of the optical fiber is 1.46, the tilt angle θp of the end face of the core 120a, 120b is 11.359°. Thus, by working the end faces of the cores 120a, 120b to make it have a tilt angle of 11.359°, a collimator structure having two cores, which is also called a dual collimator, can be constructed in the conditions that the mirror 22 is positioned at a distance from the end faces of the cores 120a, 120b of 2 millimeters. In such a collimator structure having two cores, a parallel beam of signal light can be emitted from the first optical fiber 10a toward the mirror 22, and a parallel beam of light reflected by the mirror 22 can be made to accurately enter the second optical fiber 10b.

The end faces of the cores 120a, 120b can be readily worked to have a certain tilt angle by grinding. In the optical collimator structure of this embodiment, the cores 120a, 120b can be provided with a certain tilt angle by inserting the cores 120a, 120b into the capillary 14 and fixing them to the capillary 14, adhering the optical fiber 10 to the ferrule 16, and grinding the end faces of the cores 120a, 120b along with the end face of the capillary 14 to have a predetermined tilt angle. The capillary 14 and the cores 120a, 120b may be ground to create a prism-like shape (in this case, one of the cores is located at one of the faces of the prism, and the other is located at another face of the prism), or a conical shape. Even if the collimator structure takes either shape, there is no significance difference in optical function. The conically shaped end face may be created more easily than the prism-like shape end face.

The cores 120a, 120b are obtained by fusion bonding the GI optical fibers 121 to the end of the cores 120 of the single-mode optical fibers 10a, 10b. Thus, the accuracy of the collimator structure depends on the accuracy of the length of the GI optical fibers 121. In the collimator structure of this embodiment, as the cores 120a, 120b are fixed in the capillary 14 and are then worked along with the capillary 14 to have a certain tilt angle $\theta p$, it is necessary that the GI optical fibers 121 acquire a predetermined length required to have expected collimator effect after finishing the work. Accordingly, the GI optical fibers 121 should have, prior to the working, a length that is somewhat larger than the predetermined length.

The tilt angle of the cores 120a, 120b, the ends of which are ground along with the capillary 14, vary with the distance between the mirror 22 and the cores 120a, 120b, and the distance between the cores 120a and 120b. However, it is readily possible to work the end faces of the cores 120a, 120b corresponding to the optical conditions of the components, the cores 120a, 120b and the mirror 22, as well as the positional relation therebetween, which allows various optical components and arrangement thereof to be used. Grinding the end faces of the cores 120a, 120b to provide them with a certain tilt angle has an advantage of allowing for high accuracy working thereof.

Further, as the optical collimator structure of this embodiment can be produced only by supporting the cores 120a, 120b by the capillary 14 and then inserting the optical fiber 10 along with the capillary 14 in the ferrule 16 for the fixing with the adhesive 18, there is also an advantage that the number of the parts used is small and the fabrication thereof is easy.

Although the optical collimator structure having the two cores shown in FIG. 1 uses the mirror 22 arranged in front of the optical collimator structure, the optical collimator structure of the invention can use various optical modules comprising, in place of the mirror 22, a filter, a branching filter or the like. Thus, the optical collimator structure of the invention can be used to partially pass a beam of signal light from the first optical fiber 10a through a filter while reflecting part of the beam of signal light by the filter toward the second optical fiber 10b, or totally pass a beam of signal light from the first optical fiber 10a through a filter while passing an incident beam of light from another source through the filter to allow it to enter the second optical fiber 10b, by way of example.

When the optical collimator structure of the invention is used in an optical arrangement of components such as one shown in FIG. 1, in which the unitary optical fibers 10a, 10b are optically equivalently arranged, either of the fibers 10a, 10b may be used for emitting a beam of light.

Although the optical collimator structure of the above embodiment uses an optical fiber assembly having two cores, the optical collimator structure of the invention is not limited to such one using an optical fiber assembly having two cores.

Figure 4:
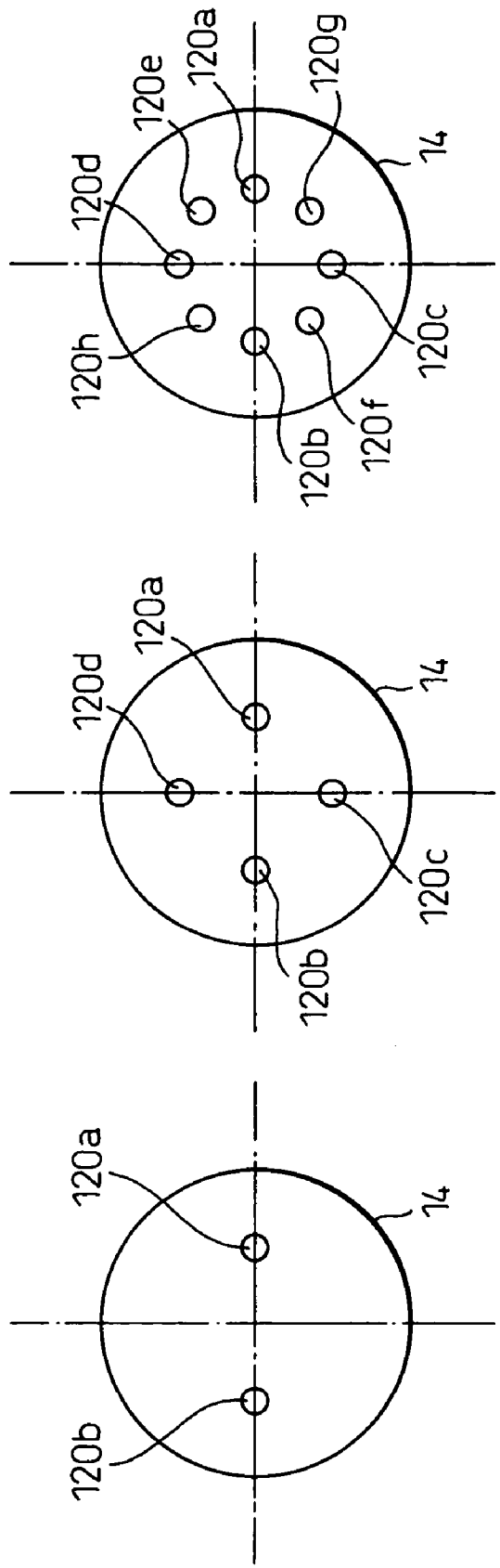
FIGS. 4A to 4C are elevational views of capillaries equipped with two, four and eight cores, respectively.
Figure 5:
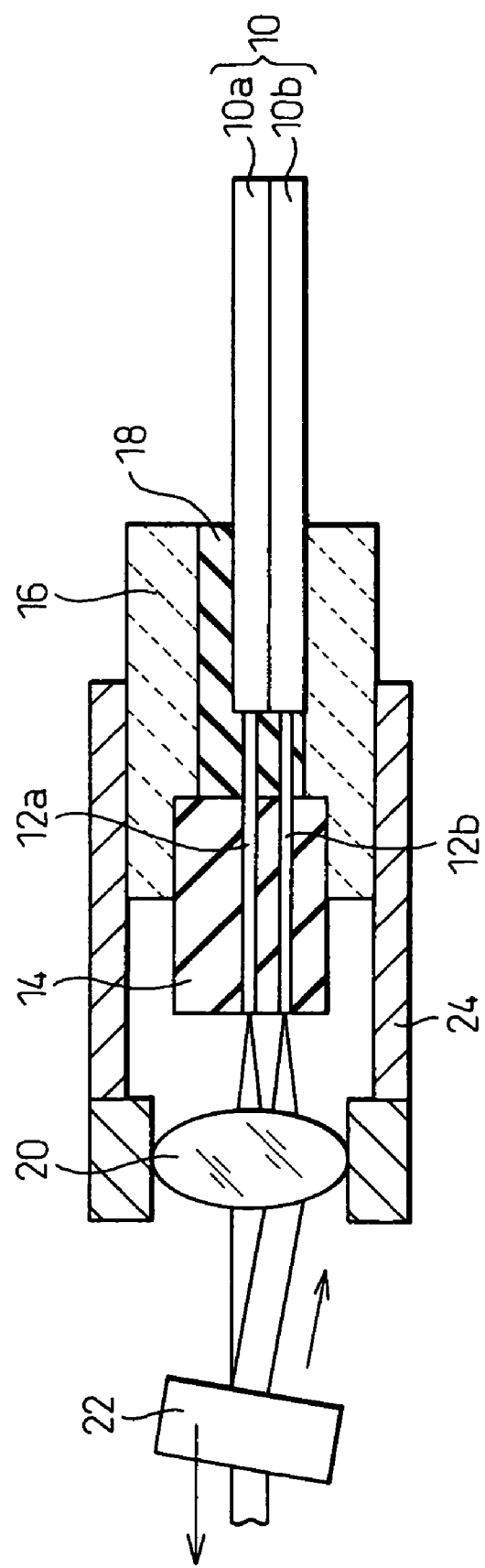
FIG. 5 shows a prior art optical collimator structure.

FIG. 4A shows an elevational view of a capillary 14 equipped with the cores 120a, 120b of the optical fiber assembly 10 as used in the above embodiment. In FIG. 4A, the two cores 120a, 120b are arranged symmetrically relative to the center of the capillary 14 (the central line of an optical collimator structure), and a beam of signal light is emitted from the core 120a and is reflected and enters the core 120b.

FIG. 4B shows an example in which cores 120c, 120d, in addition to the cores 120a, 120b, are arranged symmetrically relative to the center of the capillary 14. In the case where the four cores 120a, 120b, 120c, 120d are thus arranged, beams of signal light can also be emitted from the cores 120a and 120c and enter the core 120b and 120d, respectively, by working the end faces of the respective cores to have a certain tilt angle.

FIG. 4C shows an example in which a total of eight cores 120a–120h are arranged symmetrically relative to the center of the capillary 14. Thus, the number of cores used in the optical collimator structure of the invention is not particularly limited.

When a plurality of cores are arranged in a capillary so as to be symmetrical relative to the center line of an optical collimator structure, as shown in FIGS. 4A to 4C, a beam of signal light is emitted and received between a pair of cores arranged symmetrically relative to the center line of the collimator structure if a mirror is equipped so that the face thereof is arranged perpendicularly to the center line of the collimator structure, as shown in FIG. 1.

In contrast, when a mirror is equipped so that the face thereof is capable of orienting toward any direction by mechanical control or the like, a beam of signal light can be emitted and received between any pair of cores, which are not always arranged symmetrically relative to the center line of a collimator structure, which can be used in further various applications.

As described, the optical collimator structure of the invention, which is constructed using a capillary, a ferrule and an optical fiber assembly as main components, can have a reduced number of parts compared with a conventional optical collimator structure having a plurality of cores. In addition, as the cores used in the optical collimator structure of the invention are prepared for a collimator structure construction by bonding to the end thereof a GI optical fiber, a collimator structure having a plurality of cores can be obtained only by working the end faces of the cores to provide them with a certain tilt angle, which can facilitate the fabrication and production of the collimator structure, resulting in reduced parts cost as well as reduced manufacturing cost. Further, the optical collimator structure of the invention can address various changes in the distance between the end faces of cores and another component, such as a mirror, only by adjusting the tilt angle of the end faces of the cores.

What is claimed is:

1. An optical collimator structure, comprising:
    an optical fiber assembly of a plurality of unitary single-mode optical fibers each having a core;
    a ferrule, the optical fiber assembly being inserted partially into the ferrule and bonded thereto, and supported thereby;
    the core having a graded index optical fiber bonded to an end face of the core;
    the graded index optical fiber, along with the end portion of the core to which the graded index optical fiber is bonded, being inserted into a hole of a capillary provided at an end of the ferrule, the capillary having a conically shaped end face, at which an end face of the graded index optical fiber is located; and
    the end face of the graded index optical fiber, for emitting or receiving a beam of light, having a tilt angle relative to an optical axis of the optical collimator structure.

2. The optical collimator structure of claim 1, wherein the end face of the graded index optical fiber has a tilt angle relative to the optical axis of the optical collimator structure.

3. The optical collimator structure of claim 2, wherein the tilt angle of the end face of the graded index optical fiber is the same as the tilt angle of the capillary relative to the optical axis of the optical collimator structure.

4. The optical collimator structure of claim 1, wherein the capillary has an end with facets, at one of which facets the end face of the graded index optical fiber is located.

5. The optical collimator structure of claim 1, wherein the end faces of the respective graded index optical fibers are arranged symmetrically relative to the center of the capillary.

6. The optical collimator structure of claim 1, wherein the graded index optical fiber is bonded to the end of the core by fusion bonding.

7. The optical collimator structure of claim 1, which is used in combination with an optical component.

8. The optical collimator structure of claim 7, wherein the optical component is a mirror, a filter, or a branching filter.

9. The optical collimator structure of claim 1, which emits a beam of light and receives a totally or partially reflected beam of light.

10. The optical collimator structure of claim 1, which only emits a beam of light.

11. The optical collimator structure of claim 1, which only receives a beam of light.

* * * * *